(12) United States Patent
Zalewski

(10) Patent No.: US 12,626,436 B2
(45) Date of Patent: May 12, 2026

(54) USING STABLE DIFFUSION TO PRODUCE BACKGROUND-FREE IMAGES CONFORMING TO TARGET COLOR

(71) Applicant: Sony Interactive Entertainment LLC, San Mateo, CA (US)

(72) Inventor: Sophia Zalewski, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 93 days.

(21) Appl. No.: 18/483,227

(22) Filed: Oct. 9, 2023

(65) Prior Publication Data

US 2024/0062442 A1 Feb. 22, 2024

(51) Int. Cl.
| | |
|---|---|
| *G06T 11/60* | (2006.01) |
| *G06T 5/70* | (2024.01) |
| *G06T 11/10* | (2026.01) |
| *A63F 13/63* | (2014.01) |

(52) U.S. Cl.
CPC ................ *G06T 11/60* (2013.01); *G06T 5/70* (2024.01); *G06T 11/10* (2026.01); *A63F 13/63* (2014.09); *G06T 2207/10024* (2013.01); *G06T 2207/20081* (2013.01); *G06T 2207/20084* (2013.01)

(58) Field of Classification Search
CPC ......... G06T 11/001; G06T 2207/20081; G06T 2207/20084; G09G 5/02; G06N 3/02
See application file for complete search history.

(56) References Cited

U.S. PATENT DOCUMENTS

| | | | |
|---|---|---|---|
| 2018/0295375 A1 | 10/2018 | Ratner | |
| 2021/0295801 A1 | 9/2021 | Chao et al. | |
| 2023/0214461 A1 | 7/2023 | Brooks | |
| 2024/0037812 A1 | 2/2024 | Zalewski | |
| 2024/0062436 A1 | 2/2024 | Zalewski | |
| 2024/0169622 A1* | 5/2024 | Xie | G06T 11/00 |
| 2024/0354903 A1* | 10/2024 | Reid | G06T 13/80 |
| 2025/0117978 A1 | 4/2025 | Chugh et al. | |

FOREIGN PATENT DOCUMENTS

| | | |
|---|---|---|
| CN | 116416342 A | 7/2023 |
| CN | 116630482 A | 8/2023 |
| CN | 116824004 A | 9/2023 |

OTHER PUBLICATIONS

"Basic Inpainting Guide" @duskydreams. Aug. 25, 2023. https://civitai.com/articles/161/basic-inpainting-guide. (Year: 2023).*
"International Search Report and Written Opinion", dated Dec. 5, 2024, from the counterpart PCT application PCT/US24/49011.
Feng, Yingchaojie et al. "PromptMagician: Interactive Prompt Engineering for Text-to-Image Creation." IEEE Transactions on Visualization and Computer Graphics 30 (2023): 295-305.

(Continued)

*Primary Examiner* — Antonio A Caschera
(74) *Attorney, Agent, or Firm* — Fish & Richardson P.C.

(57) ABSTRACT

Generating custom team emblems using stable diffusion based on input text describing a desired image. A circle is overlaid in the center of a pure-color background representing each team's "color" and used as the input to stable diffusion img2img to produce emblems. This produces high-quality emblem outputs that generally match the input color.

20 Claims, 9 Drawing Sheets

Overlay Circle In Middle Of Color Image ⟍800

Add Noise Only In Circle, No Noise/Little Noise Inside & Outside Circle ⟍802

(56) References Cited

OTHER PUBLICATIONS

Wu, Weijia et al. "DiffuMask: Synthesizing Images with Pixel-level Annotations for Semantic Segmentation Using Diffusion Models." 2023 IEEE/CVF International Conference on Computer Vision (ICCV) (2023): 1206-1217.

Cuenca et al., "Using LoRA for Efficient Stable Diffusion Fine-Tuning", Hugging Face, Jan. 26, 2023, retrieved from https://huggingface.co/blog/lora#using-lora-for-efficient-stable-diffusion-fine-tuning.

Guttenberg, Nicholas, "Diffusion with Offset Noise", CrossLabs, Jan. 30, 2023, retrieved from https://www.crosslabs.org/blog/diffusion-with-offset-noise#:~:text=The%20usual%20way%20diffusion%20models%20are%20formulated%20is,receives%20its%20own%20random%20sample%20at%20each%20step.

Zalewski, Sophia, "Modifying Stable Diffusion to Produce Images With Background Eliminated", file history of related U.S. Appl. No. 18/483,218, Oct. 9, 2023.

Zalewski, Sophia, "Using Stable Diffusion to Produce Images Conforming to Color Palette", file history of related U.S. Appl. No. 18/483,207, filed Oct. 9, 2023.

[No Author Listed], "Guide: What Denoising Strength Does and Howto Use It in Stable Diffusion," Once Upon an Algorithm, Mar. 20, 2023, retrieved on Jun. 24, 2025, retrieved from URL<https://web.archive.org/web/20230329103446/https://onceuponanalgorithm.org/guide-what-denoising-strength-does-and-how-to-use-it-in-stable-diffusion/>, 4 pages.

civitai.com [online], "ControlNet T2I-Adapter Models," Mar. 8, 2023, retrieved on Jun. 24, 2025, retrieved from URL<https://civitai.com/models/17220/controlnet-t2i-adapter-models>, 4 pages.

Mou et al., "T2I-Adapter: Learning Adapters to Dig out More Controllable Ability for Text-to-Image Diffusion Models," CoRR, Submitted on Mar. 20, 2023, arXiv:2302.08453v2, 10 pages.

TouchDesigner by Derivative, "Random pixel sampling," (Jan. 2022). TouchDesigner forum, Jan. 2022, retrieved on Jun. 24, 2025, retrieved from URL<https://web.archive.Org/web/20220129043030/https://forum.derivative.ca/t/random-pixel-sampling/235882>, 3 pages.

Welsh et al., "Transferring Color to Greyscale Images," Jul. 1, 2002, SIGGRAPH '02: Proceedings of the 29th annual conference on Computer graphics and interactive techniques, pp. 277-280.

* cited by examiner

Prompt: "Cat Sitting On Leaves"

Case 1 - Solid Color

Case 2 - Multiple Color

USING STABLE DIFFUSION TO PRODUCE BACKGROUND-FREE IMAGES CONFORMING TO TARGET COLOR

FIELD

The present application relates to technically inventive, non-routine solutions that are necessarily rooted in computer technology and that produce concrete technical improvements, and more specifically to using generative networks to produce images with colors conforming to input.

BACKGROUND

Generative AI is a general term that refers to a type of neural network such as a large language model (LLM) such as a generative pre-trained transformer (GPTT) that can generate comparatively complex output based on comparatively terse input. An example of a LLM from the multi-domain realm is stable diffusion, which employs a series of neural networks to generate images from one or a few input words describing the desired image. As understood herein, improvements to stable diffusion are possible.

SUMMARY

As understood herein and with more particularity, the color palette of an image produced by stable diffusion (SD) may precisely match a desired palette of the desired image. As an example, it may desirable to generate custom in-game icons and emblems for a computer simulation such as a computer game based on different team colors, essentially meaning that SD should be fine-tuned for emblem generation.

Accordingly, an apparatus includes at least one processor assembly configured to overlay an image of an enclosed shape in a center of a background. The image of the enclosed shape and the background represent at least two desired colors of an image output by a stable diffusion (SD) model. The processor assembly is configured to input the image of the enclosed shape in the center of the background along with the background as an image to the SD model, and present an output image from the SD model generated responsive to a text input and the image of the enclosed shape in the center of the background.

In example embodiments, the enclosed shape includes a circular ring.

The enclosed shape can be of one and only one color or it may include plural colors, such as a pixelated multi-color palette. The pixelated color palette can have a resolution of at least four pixels and no more than one hundred twenty eight by one hundred twenty eight (128×128) pixels.

In some embodiments the processor assembly can be configured to input to the SD model at least one strength parameter used by the SD model to generate the output image. In non-limiting examples the strength parameter is at least 0.9.

As set forth further below, if desired the processor assembly may be configured to add noise within the enclosed shape and not add noise to portions of the background. In some examples the output image from the SD model includes an inner image and a background surrounding the inner image, and the processor assembly may be configured to remove the background surrounding the inner image in a post-processing step.

In another aspect, a method includes using a stable diffusion (SD) model to produce images in at least one desired color at least in part by inputting to the SD model at least one guidance image in the form of a shape in a foreground of a background. The shape is in a first color and the background is in at least a second color. The method includes adding noise within the shape but not adding noise inside an inner boundary of the shape or to portions of the background to force colors in an image output by the SD model to match input colors of the guidance image.

In another aspect, an apparatus includes at least one computer medium that is not a transitory signal and that in turn includes instructions executable by at least one processor assembly to input at least one image to a stable diffusion (SD) model. The image includes an endless shape in a first color superimposed onto a background in at least a second color. The instructions are executable to add noise to the image only within boundaries of the endless shape and not to portions of the background. Further, the instructions are executable to receive from the SD model at least one output image having colors conforming to the first and second colors, and remove background portions from the output image to render a final image.

The details of the present disclosure, both as to its structure and operation, can be best understood in reference to the accompanying drawings, in which like reference numerals refer to like parts, and in which:

DETAILED DESCRIPTION

Figure 1:
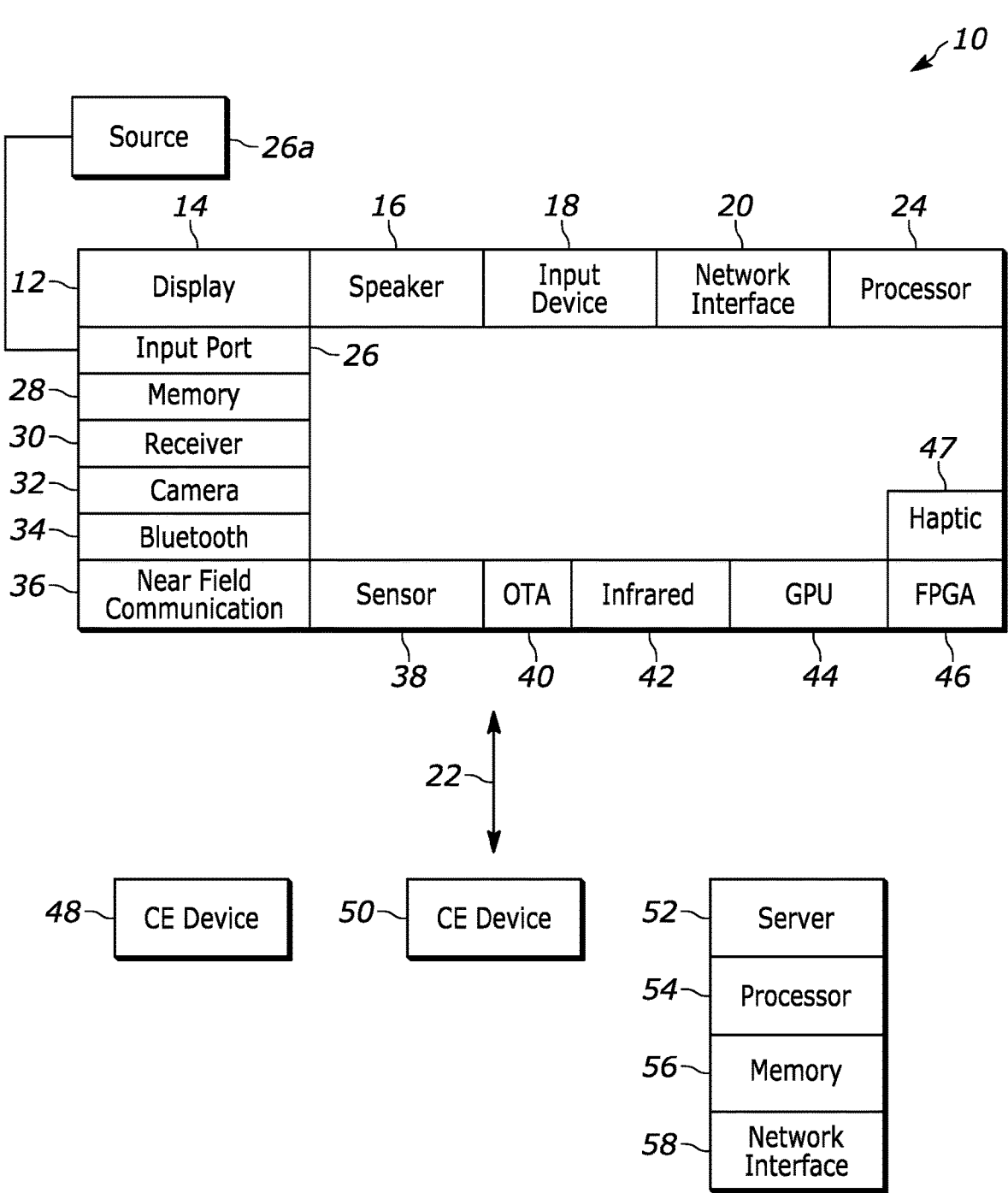
FIG. 1 is a block diagram of an example system including an example in consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Large language models (LLM) such as generative pre-trained transformers (GPTT) and stable diffusion (SD) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
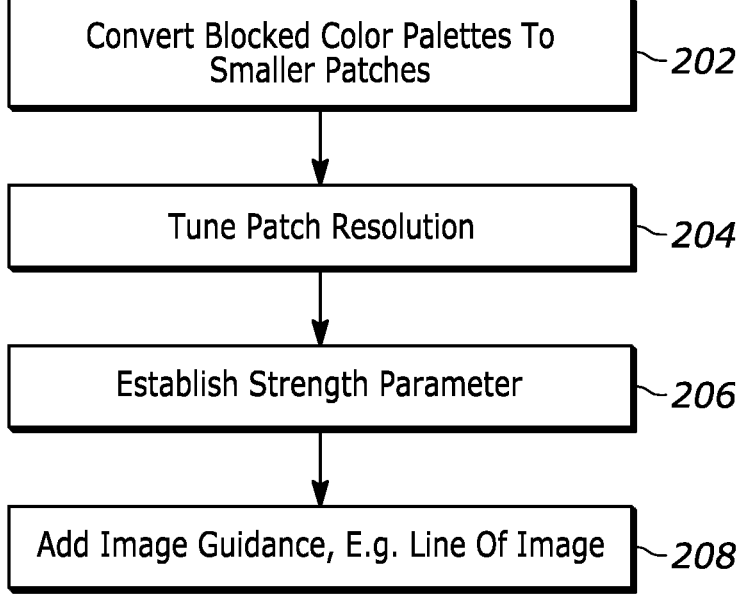
FIG. 2 illustrates example logic in example flow chart format consistent with present principles.

Refer now to FIG. 2 for an overall understanding of a first example of present techniques. In the first example, a pixelated multi-color palette with an optional guidance image is input to a SD model to achieve a desired target color for an image generated in response to a short text input description. The optional guidance image may be used for more accurate output images in terms of conforming to the desired foreground object and permit the use of lower strength values.

Commencing at state 202, to condition the SD model on a target color scheme, a multi-color palette representation can be established that represents a desired primary target color and one or more background colors. The color palette representation may be used as an input image to img2img stable diffusion with a very high strength parameter (e.g., greater than 0.9). The resulting output images tend to follow the color scheme of the original palette input.

While inputting blocked color palettes into img2img with high strength (e.g., 0.99, to follow the input image less closely) returns effective results in terms of output color, as indicated at state 202 a blocked color pattern is converted to smaller pixelated color patch palettes to better obviate distinct spatial patterns in the input image.

The size of these patches may range from four pixels by four pixels to one hundred fifty six to one hundred fifty six pixels in some embodiments, although other embodiments may use patches of different sizes. In an example, a pixelated color patch palette may be sixteen pixels by sixteen pixels.

Figure 3:
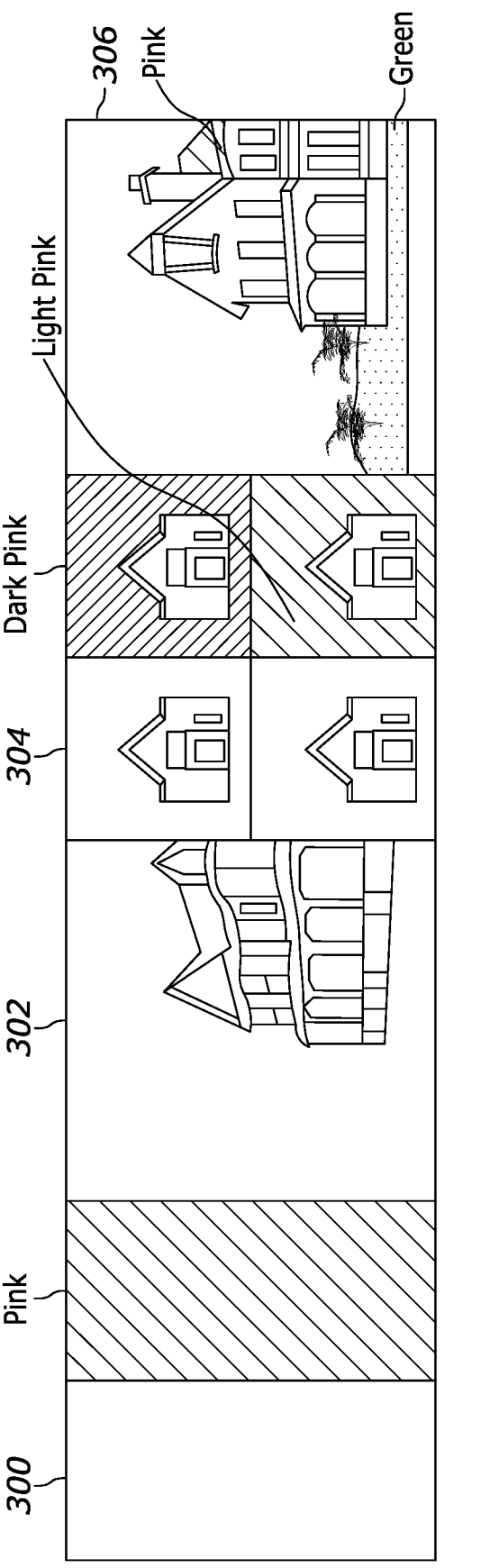
FIG. 3 illustrates an example blocked color palette with resulting images.
Figure 4:
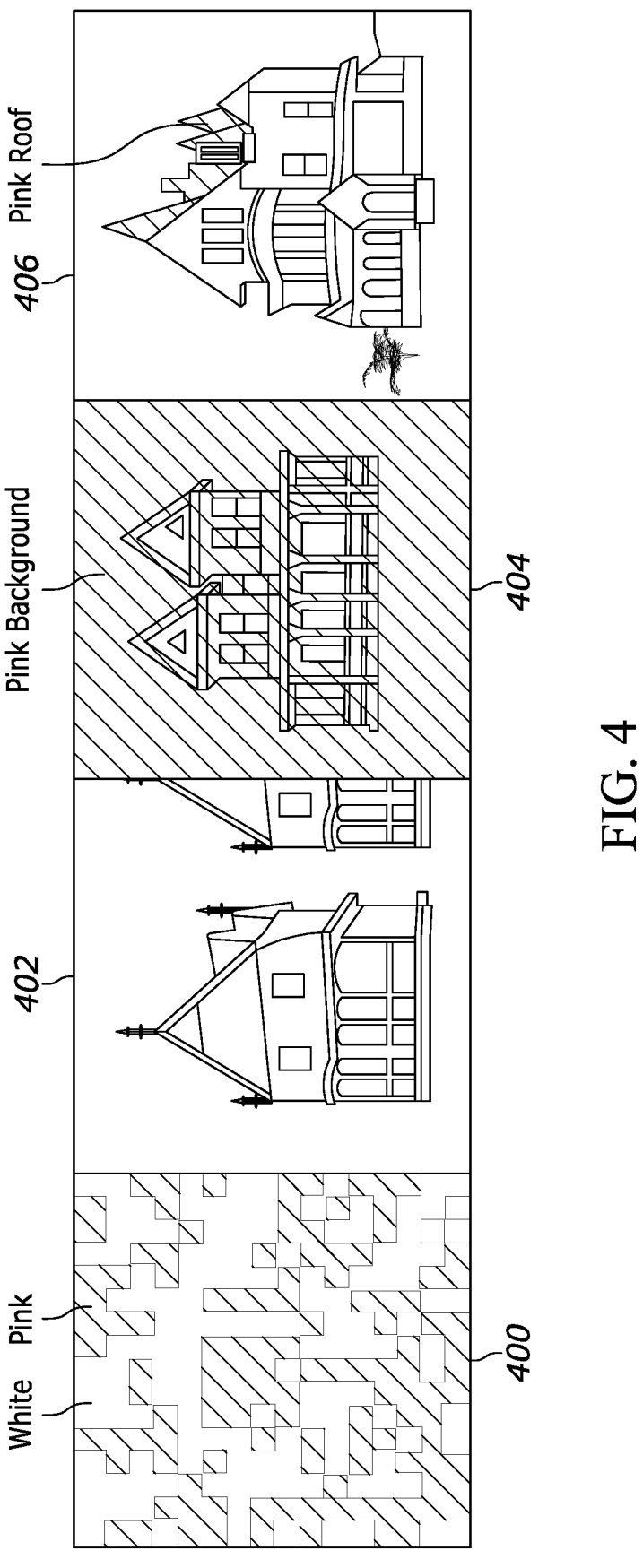
FIG. 4 illustrates an example pixelated patch color palette representation with resulting images.

Referring briefly to FIGS. 3 and 4, in FIG. 3 input of a "blocked" color palette 300 consisting of a white stripe next to a pink stripe in the non-limiting example causes the SD model to generate, in response to a prompt "a cute Victorian house photorealistic" with a strength=0.99 and with respective seeds=[0, 1, 2, 3], respective pink and white images 302, 304, 306 of a house with colors noted on the Figure.

In FIG. 4, however, input of a pixelated color patch palette 400 to the SD model with the same prompt, strength, and seeds causes the SD model to generate respective images 402, 404, 406 with noted colors in the Figure.

Pixelated patches produce better outputs, while blocked palettes may cause resulting images to match the semantic format of the input too closely. However, either may be used consistent with present principles.

In one example technique, to produce a color patch palette from a "blocked" representation, a random pixel in the blocked palette may be sampled for every pixel in the patched palette being created. This generates a random "patch" of colors with no spatial dependencies, but still contains the colors in the palette in their corresponding ratios. Non-limiting example code for this technique may be:

```
# Pixelates a given color palette
def palette_to_palette(palette, chunks=16):
    width,height = palette.size
    pixels = palette.load( )
    new_palette = Image.new(mode="RGB", size=(chunks, chunks))
    new_pixels = new_palette.load( )
    for i in range(chunks):
        for j in range(chunks):
            x = random.randrange(width)
            y = random.randrange(height)
            new_pixels[i,j] = pixels[x,y]
    return new_palette.resize((512,512),resample
```

Returning to FIG. 2, at state 204 patch resolution may be tuned. Because palette patches display the necessity for the input image to look somewhat random, the next logical step is to determine what resolution of pixelation produces the best results. Any dimension of pixelated input palettes containing at least four pixels was capable of providing a sufficiently random sample to produce outputs without any spatial dependencies on the input palette given a high strength parameter. In example implementations, palette patches with greater than eight by eight (8×8) pixels are preferred. With more pixels the output image generated by the SD model has a more fine-grained output although a patch with 512×512 pixels produces outputs that look highly granulated like a newspaper image, so, palettes with pixelated resolutions anywhere in the range of eight by eight (8×8) to one hundred twenty eight by one hundred twenty eight (128×128) are preferred.

Figure 5:
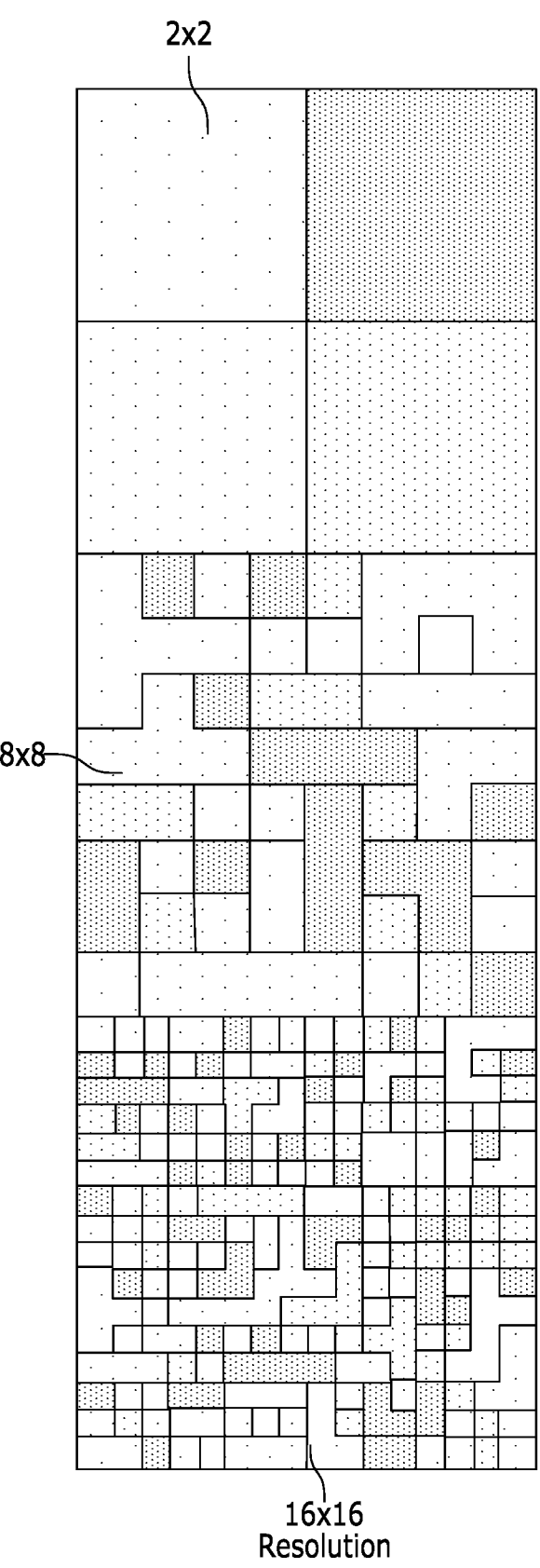
FIG. 5 illustrates three example pixelated patch color palette representations.

FIG. 5 illustrates color palette patch "resolution" (with resulting example images omitted) for resolutions [2×2, 8×8, 16×16], prompt="a cute Victorian house photorealistic", strength=0.99, seeds=[0, 1, 2, 3].

Note that because palette patches are created somewhat randomly, output figures of images with palette patches created from the same blocked palette representation (which are slightly different each time due to randomness) may be produced. The slight differences in the palette patches produce slightly different outputs even for the same random seed in the stable diffusion generator, meaning the pixelated palette acts as a second random "seed" that slightly influences the output image.

Moving to state 206 of FIG. 2, the strength parameter noted above may be established. Any "strength" value less than 0.9 in the stable diffusion pipeline tends to produce results that too closely resemble the input palette, although such strength values under 0.9 may be used.

Proceeding to state 208 of FIG. 2, to generate high quality output with a lower strength value (following closer to the palette), the line embedding of a relevant image may be added to the input palette as image guidance. This technique allows images to appear visually similar to the guidance image, but in the correct user-specified palette.

Figure 6:
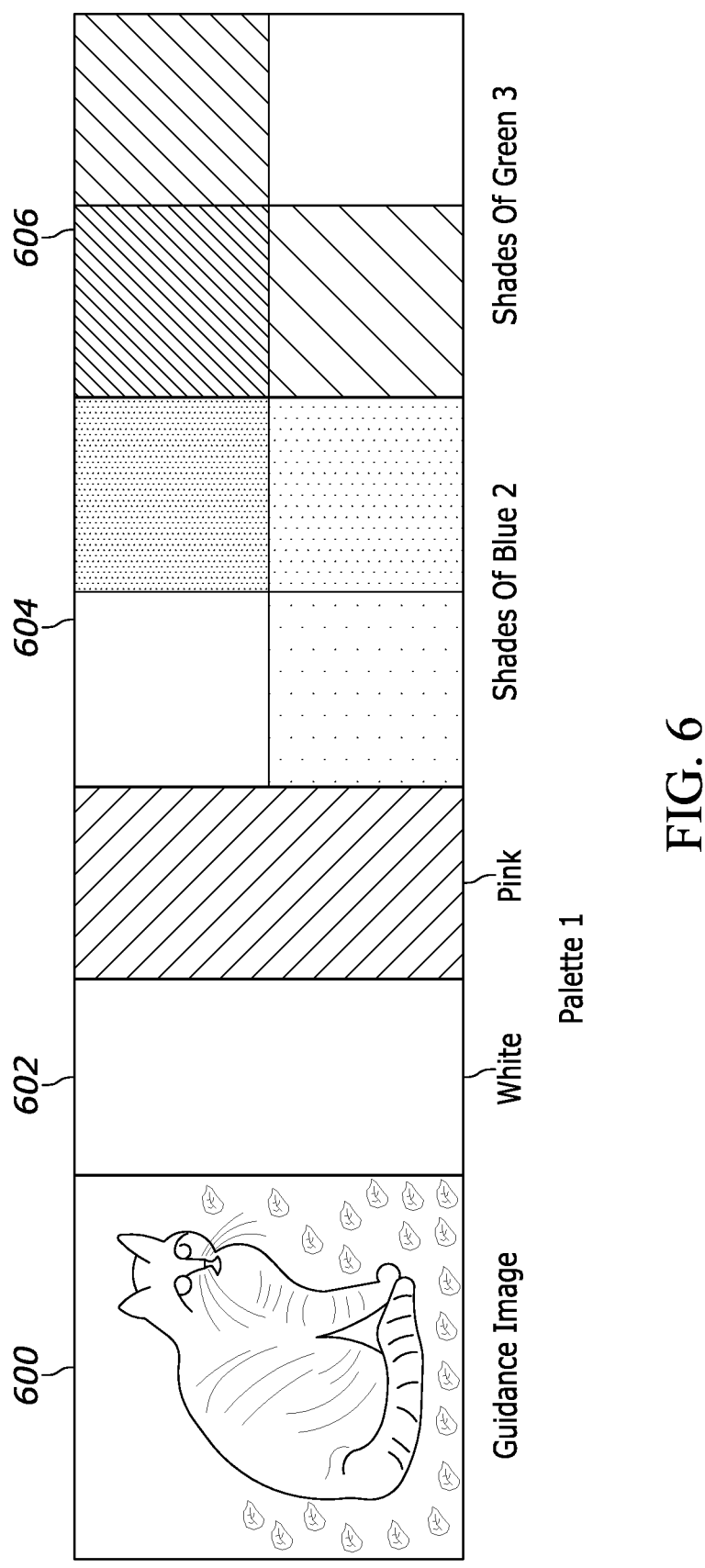
FIG. 6 illustrates addition of a guidance image or portion thereof to example color palettes.
Figure 7:
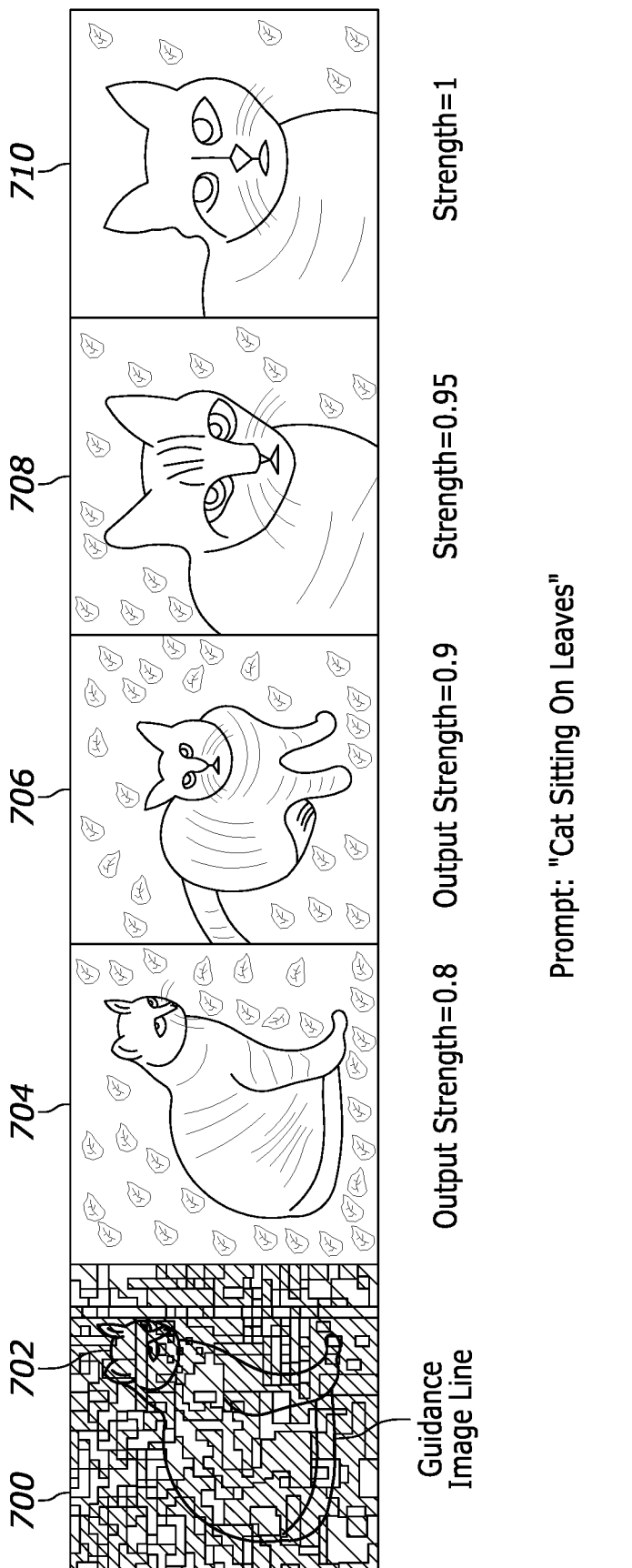
FIG. 7 illustrates a guidance image line to be input with color palettes to render respective images at respective strengths.

FIG. 6 illustrates. To illustrate, portions of a guidance image 600, in this case, of a cat, is shown for combining with any one of three target color palettes 602, 604, 606 and input to the SD model. FIG. 7 illustrates in greater detail. A pixelated palette 700 with embedded cat image line 702 is used as input to a SD model along with the prompt "cat sitting on leaves" to cause the SD model to generate respective output images 704, 706, 708, 710 for respective strength values 0.8 to 1.

Accordingly, in example implementations an input palette produces best results with a "patch" representation and resolution of between 8×8 and 256×256 pixels, plus a guidance image outline embedding. A strength value of between 0.9 and 1 may be used, depending on the palette and the text prompt describing the desired image. Palette patches act as an added random seed that slightly influences minute details in the output image.

Figure 8:
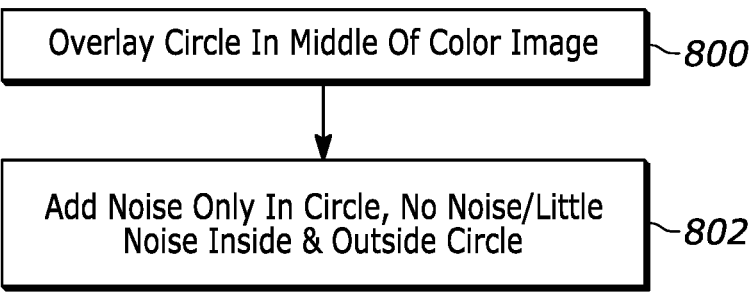
FIG. 8 illustrates alternate example logic in example flow chart format.
Figures 9, 10, 11, 12:
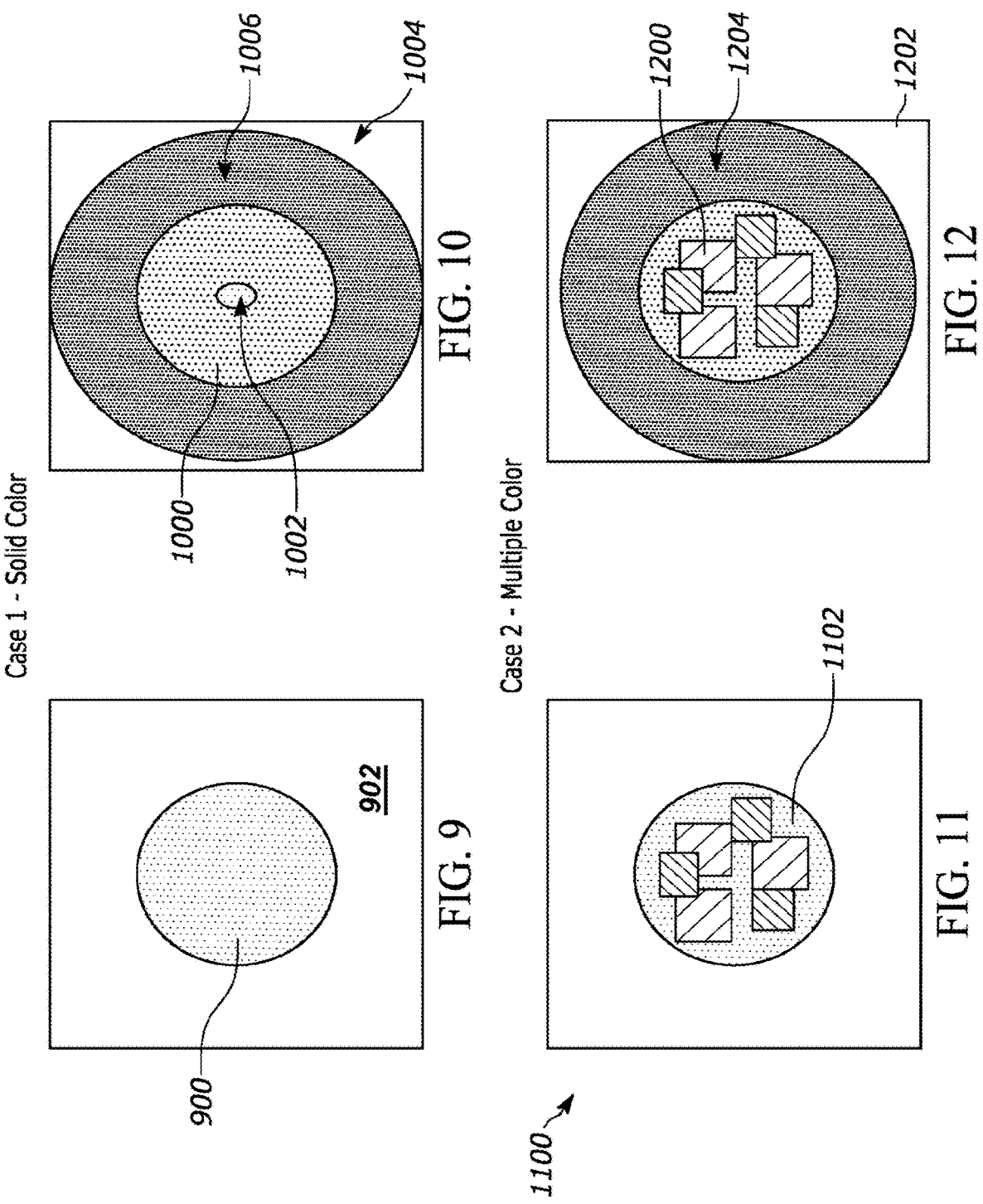
FIG. 9 illustrates a guidance image consistent with FIG. 8.
FIG. 10 illustrates operation on the image of FIG. 9.
FIG. 11 illustrates another example guidance image.
FIG. 12 illustrates operation on the image of FIG. 11.

FIGS. 8 and 9 illustrate a second example of present techniques. Because one example use-case for color palette-conditioned stable diffusion is generating custom in-game icons and emblems based on different team colors, it is important that this method works functionally on a stable diffusion model fine-tuned for emblem generation. To generate custom team emblems with this method, as indicated at state 800 in FIG. 8 and as illustrated in FIG. 9, an enclosed shape such as a triangle, rectangle, or, in the example shown, a circle 900 may be overlaid in the center of a pure-color background or pixelated multi-color background 902 representing each team's "color" and used as the input to stable diffusion img2img given a fine-tuned U-net to produce emblems to produce high-quality emblem outputs that generally match the input color.

Whereas in the first technique illustrated in FIG. 2 and related figures a pixelated color palette is used to which noise is added uniformly and then removed with background removal, in the second technique of FIGS. 8 and 9 a guidance image in the form of the shape such as a circle or ring 900 is provided (state 800 in FIG. 8) in the foreground in a first color with a second, contrasting background color 902. In the example of FIG. 9, the foreground 900 is a solid circle of a desired color, e.g., yellow, whereas the background 902 is a different color, e.g., blue. In this technique, as indicated at state 802 in FIG. 8 noise is added within the shape (in FIG. 9, within a circular donut formed by the outer part of the foreground 900 but not in the center of the foreground)). The noise added inside the "donut" forces output colors to match input colors of the image shown in FIG. 9 for producing, using the SD model, emblems such as team emblems. FIG. 10 illustrates that noise is added to a donut 1000 formed by the foreground 900 of FIG. 9 but not in a central small disk 1002 of the foreground so that the color in the small disk 1002 will remain unchanged in the final output image. Areas 1004 of the background are not "noised" and so the background color there will remain unchanged in the final output image. Moreover, noise may be added to a region 1006 of the background surrounding the donut 1000 of the foreground, so that the Asd model will fill in the "noised" 1000, 1006 areas to conform to the input text prompt.

The SD model then removes the noise within the inner and outer boundaries of the donut-shaped rings 1000, 1006. Then, in a postprocess step the background, i.e., the portion of the image outside the outer boundary of the circle 900, is removed to render a resulting image that represents centered emblems in the target color within the circle with the background removed.

Combinations of the techniques herein may be used. For example, instead of a pure color background 902, the second technique may use a multi-color pixelated background established using all or portions of the first method of FIG. 2.

FIGS. 11 and 12 illustrate an alternate guidance image 1100 that uses, within a foreground circle 1102, a multiple colored palette with pixelated colors inside the circle only (where noise is implemented on them as shown in FIG. 12 at 1200), with no noise in edges 1202 of the background. Noise is added within the foreground 1102 and a donut 1204 around the foreground so the output image will conform to the text prompt. The resulting image would still contain that pixelization in the noised areas and the colors of the noised areas will still somewhat match the colors within the foreground 1102 of FIG. 11.

While particular techniques are herein shown and described in detail, it is to be understood that the subject matter which is encompassed by the present application is limited only by the claims.

What is claimed is:

1. A method comprising:
   using a stable diffusion (SD) model to produce images in at least one desired color at least in part by:
   inputting to the SD model at least one guidance image in the form of a shape representing a foreground within a background, the shape being in a first color and the background being in at least a second color;
   adding noise within the shape but not adding noise inside an inner boundary of the shape or along edges of the background to force colors in an image output by the SD model to match input colors of the guidance image; and
   presenting the image output by the SD model.

2. The method of claim 1, comprising removing the noise within the shape.

3. The method of claim 1, comprising removing background in the image output by the SD model.

4. The method of claim 1, wherein the image output by the SD model comprises an emblem.

5. The method of claim 1, wherein the shape comprises a circular ring.

6. The method of claim 1, wherein the shape comprises one and only one color.

7. The method of claim 1, wherein the shape comprises a plurality of colors.

8. The method of claim 1, wherein shape comprises a pixelated color palette.

9. The method of claim 8, wherein the pixelated color palette has a resolution of at least four pixels and no more than one hundred twenty eight by one hundred twenty eight (128×128) pixels.

10. The method of claim 1, comprising:
    inputting to the SD model at least one strength parameter used by the SD model to generate the output image.

11. The method of claim 10, wherein the strength parameter is at least 0.9.

12. The method of claim 1, wherein the guidance image comprises an emblem.

13. The method of claim 1, wherein the image comprises an emblem.

14. The method of claim 1, wherein at least one of the first color or the second color comprises one and only one color.

15. One or more non-transitory computer storage media encoded with computer program instructions that when executed by one or more computers cause the one or more computers to perform operations comprising:
    using a stable diffusion (SD) model to produce images in at least one desired color at least in part by:
    inputting to the SD model at least one guidance image in the form of a shape representing a foreground within a background, the shape being in a first color and the background being in at least a second color;
    adding noise within the shape but not adding noise inside an inner boundary of the shape or along edges of the background to force colors in an image output by the SD model to match input colors of the guidance image; and
    presenting the image output by the SD model.

16. The media of claim 15, wherein the operations comprise removing the noise within the shape.

17. The media of claim 15, wherein the operations comprise removing background in the image output by the SD model.

18. The media of claim 15, wherein the image output by the SD model comprises an emblem.

19. The media of claim 15, wherein at least one of the first color or the second color comprises one and only one color.

20. A system comprising:
    one or more computers and one or more storage devices on which are stored instructions that are operable, when executed by the one or more computers, to cause the one or more computers to perform operations comprising:
    using a stable diffusion (SD) model to produce images in at least one desired color at least in part by:
    inputting to the SD model at least one guidance image in the form of a shape representing a foreground within a background, the shape being in a first color and the background being in at least a second color;
    adding noise within the shape but not adding noise inside an inner boundary of the shape or along edges of the background to force colors in an image output by the SD model to match input colors of the guidance image; and presenting the image output by the SD model.

\* \* \* \* \*